(12) United States Patent
Athalye

(10) Patent No.: US 9,131,561 B2
(45) Date of Patent: Sep. 8, 2015

(54) SOLID-STATE LIGHTING APPARATUS AND METHODS USING ENERGY STORAGE

(75) Inventor: Praneet Jayant Athalye, Morrisville, NC (US)

(73) Assignee: Cree, Inc., Durham, NC (US)

( * ) Notice: Subject to any disclaimer, the term of this patent is extended or adjusted under 35 U.S.C. 154(b) by 300 days.

(21) Appl. No.: 13/235,103

(22) Filed: Sep. 16, 2011

(65) Prior Publication Data
US 2013/0069535 A1 Mar. 21, 2013

(51) Int. Cl.
H05B 37/02 (2006.01)
H05B 33/08 (2006.01)

(52) U.S. Cl.
CPC ........ *H05B 33/0809* (2013.01); *H05B 33/0824* (2013.01)

(58) Field of Classification Search
USPC .......... 315/185 R, 186, 192, 200 R, 291, 294, 315/297, 306, 307
See application file for complete search history.

(56) References Cited

U.S. PATENT DOCUMENTS

| | | | |
|---|---|---|---|
| 4,504,776 A | 3/1985 | Haville | |
| 4,798,983 A | 1/1989 | Mori | |
| 4,839,535 A | 6/1989 | Miller | |
| 5,059,890 A | 10/1991 | Yoshikawa et al. | |
| 5,397,938 A | 3/1995 | Wilhelm et al. | |
| 5,504,448 A | 4/1996 | Bennett et al. | |
| 5,598,068 A | 1/1997 | Shirai | |
| 5,803,579 A | 9/1998 | Turnbull et al. | |
| 5,941,626 A | 8/1999 | Yamuro | |
| 6,137,235 A | 10/2000 | Franck | |
| 6,153,980 A | 11/2000 | Marshall et al. | |
| 6,323,597 B1 | 11/2001 | Janning | |
| 6,556,067 B2 | 4/2003 | Henry | |
| 6,784,622 B2 | 8/2004 | Newman, Jr. et al. | |
| 6,798,152 B2 * | 9/2004 | Rooke et al. .............. | 315/209 R |
| 7,088,059 B2 | 8/2006 | McKinney et al. | |
| 7,144,140 B2 | 12/2006 | Sun et al. | |

(Continued)

FOREIGN PATENT DOCUMENTS

| CN | 1575623 A | 2/2005 |
|---|---|---|
| CN | 101137261 A | 3/2008 |

(Continued)

OTHER PUBLICATIONS

Japanese Office Action Corresponding to Japanese Patent Application No. 2012-530920; Mailing Date: Sep. 17, 2013; 4 Pages.

(Continued)

*Primary Examiner* — Tung X Le
(74) *Attorney, Agent, or Firm* — Myers Bigel Sibley & Sajovec, P.A.

(57) ABSTRACT

An apparatus includes a current control circuit configured to selectively provide current responsive to a varying voltage to at least one LED coupled in series with the first current control circuit and to at least one capacitor coupled to the at least one LED and the first current control circuit. The current control circuit may be configured to cause the at least one capacitor to be selectively charged from a current source and to be discharged via the at least one LED responsive to a varying input, such as a varying current from the current source or a varying voltage applied to the current source. For example, the current control circuit may be configured to limit current through the at least one LED to less than a current provided by the current source.

33 Claims, 16 Drawing Sheets

(56) References Cited

U.S. PATENT DOCUMENTS

| | | | |
|---|---|---|---|
| 7,213,940 B1 | 5/2007 | van de Ven et al. | |
| 7,271,545 B2 | 9/2007 | Hu et al. | |
| 7,291,983 B2 | 11/2007 | Hu et al. | |
| 7,307,391 B2 | 12/2007 | Shan | |
| 7,427,838 B2 | 9/2008 | Hosoya | |
| 7,614,767 B2 | 11/2009 | Zulim et al. | |
| 7,649,326 B2* | 1/2010 | Johnson et al. | 315/291 |
| 7,656,371 B2 | 2/2010 | Shimizu et al. | |
| 7,688,002 B2 | 3/2010 | Ashdown et al. | |
| 7,723,926 B2 | 5/2010 | Mednik et al. | |
| 7,781,979 B2 | 8/2010 | Lys | |
| 7,804,256 B2 | 9/2010 | Melanson | |
| 7,871,184 B2 | 1/2011 | Peng | |
| 7,994,725 B2 | 8/2011 | Bouchard | |
| 8,174,201 B2 | 5/2012 | Lee | |
| 8,242,704 B2 | 8/2012 | Lethellier | |
| 8,246,202 B2 | 8/2012 | Mart et al. | |
| 8,508,140 B2 | 8/2013 | Leung et al. | |
| 8,519,630 B2 | 8/2013 | Wang et al. | |
| 8,791,641 B2 | 7/2014 | van de Ven et al. | |
| 2002/0070914 A1 | 6/2002 | Bruning et al. | |
| 2002/0097095 A1 | 7/2002 | Jeon et al. | |
| 2004/0036418 A1 | 2/2004 | Rooke et al. | |
| 2004/0046510 A1 | 3/2004 | Allen | |
| 2004/0189218 A1 | 9/2004 | Leong et al. | |
| 2004/0208009 A1 | 10/2004 | Mardon et al. | |
| 2004/0233145 A1 | 11/2004 | Chiang | |
| 2005/0007164 A1 | 1/2005 | Callahan, Jr. | |
| 2005/0057179 A1 | 3/2005 | Madhani et al. | |
| 2005/0174065 A1 | 8/2005 | Janning | |
| 2005/0242742 A1 | 11/2005 | Cheang et al. | |
| 2006/0244396 A1 | 11/2006 | Bucur | |
| 2006/0261754 A1* | 11/2006 | Lee | 315/291 |
| 2007/0013647 A1 | 1/2007 | Lee et al. | |
| 2007/0096661 A1 | 5/2007 | Allen | |
| 2007/0108843 A1 | 5/2007 | Preston et al. | |
| 2007/0182338 A1 | 8/2007 | Shteynberg et al. | |
| 2007/0182346 A1 | 8/2007 | Shteynberg et al. | |
| 2007/0182347 A1 | 8/2007 | Shteynberg et al. | |
| 2007/0195023 A1 | 8/2007 | Kang et al. | |
| 2007/0257623 A1 | 11/2007 | Johnson et al. | |
| 2007/0267978 A1 | 11/2007 | Shteynberg et al. | |
| 2007/0273299 A1 | 11/2007 | Miskin et al. | |
| 2007/0285031 A1 | 12/2007 | Shteynberg et al. | |
| 2008/0024071 A1 | 1/2008 | Yu | |
| 2008/0048567 A1 | 2/2008 | Steele et al. | |
| 2008/0094000 A1 | 4/2008 | Yamamoto et al. | |
| 2008/0116818 A1 | 5/2008 | Shteynberg et al. | |
| 2008/0122376 A1* | 5/2008 | Lys | 315/192 |
| 2008/0129220 A1 | 6/2008 | Shteynberg et al. | |
| 2008/0150440 A1 | 6/2008 | Hsu | |
| 2008/0203946 A1 | 8/2008 | Ito et al. | |
| 2008/0211415 A1 | 9/2008 | Altamura | |
| 2009/0015759 A1 | 1/2009 | Honbo | |
| 2009/0039791 A1 | 2/2009 | Jones | |
| 2009/0079355 A1 | 3/2009 | Zhou et al. | |
| 2009/0079357 A1 | 3/2009 | Shteynberg et al. | |
| 2009/0079358 A1 | 3/2009 | Shteynberg et al. | |
| 2009/0079359 A1 | 3/2009 | Shteynberg et al. | |
| 2009/0079360 A1 | 3/2009 | Shteynberg et al. | |
| 2009/0079362 A1 | 3/2009 | Shteynberg et al. | |
| 2009/0086474 A1 | 4/2009 | Chou | |
| 2009/0140630 A1 | 6/2009 | Kijima et al. | |
| 2009/0170226 A1 | 7/2009 | Wall, Jr. | |
| 2009/0179593 A1 | 7/2009 | Yang | |
| 2009/0184662 A1 | 7/2009 | Given et al. | |
| 2009/0195168 A1 | 8/2009 | Greenfeld | |
| 2009/0251934 A1 | 10/2009 | Shteynberg et al. | |
| 2010/0026208 A1 | 2/2010 | Shteynberg et al. | |
| 2010/0045187 A1 | 2/2010 | Shteynberg et al. | |
| 2010/0060175 A1 | 3/2010 | Lethellier | |
| 2010/0072902 A1* | 3/2010 | Wendt et al. | 315/161 |
| 2010/0079262 A1 | 4/2010 | Van Laanen | |
| 2010/0090604 A1 | 4/2010 | Maruyama et al. | |
| 2010/0109537 A1 | 5/2010 | Nishino et al. | |
| 2010/0109557 A1 | 5/2010 | Bouchard | |
| 2010/0109570 A1 | 5/2010 | Weaver | |
| 2010/0123403 A1 | 5/2010 | Reed | |
| 2010/0134018 A1 | 6/2010 | Tziony et al. | |
| 2010/0194274 A1 | 8/2010 | Hoogzaad | |
| 2010/0207150 A1 | 8/2010 | Grajcar | |
| 2010/0213859 A1 | 8/2010 | Shteynberg et al. | |
| 2010/0231135 A1 | 9/2010 | Hum et al. | |
| 2010/0246197 A1 | 9/2010 | Takahashi et al. | |
| 2010/0264832 A1 | 10/2010 | Archenhold et al. | |
| 2010/0277084 A1 | 11/2010 | Lee et al. | |
| 2010/0308738 A1 | 12/2010 | Shteynberg et al. | |
| 2010/0308739 A1 | 12/2010 | Shteynberg et al. | |
| 2010/0327746 A1 | 12/2010 | Hisayasu | |
| 2011/0025217 A1 | 2/2011 | Zhan et al. | |
| 2011/0068701 A1 | 3/2011 | van de Ven et al. | |
| 2011/0101883 A1 | 5/2011 | Grajcar | |
| 2011/0109228 A1 | 5/2011 | Shimomura et al. | |
| 2011/0109244 A1 | 5/2011 | Grajcar | |
| 2011/0115394 A1 | 5/2011 | Shteynberg et al. | |
| 2011/0115411 A1 | 5/2011 | Shteynberg et al. | |
| 2011/0121754 A1 | 5/2011 | Shteynberg et al. | |
| 2011/0169417 A1 | 7/2011 | Hum et al. | |
| 2011/0180818 A1 | 7/2011 | Lerman et al. | |
| 2011/0181194 A1 | 7/2011 | Hum et al. | |
| 2011/0193467 A1 | 8/2011 | Grajcar | |
| 2011/0199003 A1 | 8/2011 | Muguruma et al. | |
| 2011/0210678 A1 | 9/2011 | Grajcar | |
| 2011/0227484 A1 | 9/2011 | Huynh | |
| 2011/0227485 A1 | 9/2011 | Huynh | |
| 2011/0227489 A1 | 9/2011 | Huynh | |
| 2011/0227490 A1 | 9/2011 | Huynh | |
| 2011/0273102 A1 | 11/2011 | van de Ven et al. | |
| 2012/0091920 A1 | 4/2012 | Yang | |
| 2012/0099321 A1 | 4/2012 | Scott et al. | |
| 2012/0176826 A1* | 7/2012 | Lazar | 363/126 |
| 2012/0194073 A1 | 8/2012 | Wang et al. | |
| 2013/0278157 A1* | 10/2013 | Radermacher | 315/186 |

FOREIGN PATENT DOCUMENTS

| | | |
|---|---|---|
| CN | 101227780 A | 7/2008 |
| CN | 101668373 A | 3/2010 |
| CN | 101772245 A | 7/2010 |
| CN | 101827481 A | 9/2010 |
| CN | 101994932 A | 3/2011 |
| CN | 201758472 A | 3/2011 |
| CN | 102804926 A | 11/2012 |
| EP | 1594348 A2 | 11/2005 |
| JP | 2005-310997 | 11/2005 |
| JP | 2006-103404 | 4/2006 |
| JP | 2006-332022 | 12/2006 |
| JP | 2008-125339 | 5/2008 |
| JP | 2008-205357 | 9/2008 |
| JP | 2008-544569 A | 12/2008 |
| JP | 2009-016280 | 1/2009 |
| JP | 2010-092776 | 4/2010 |
| TW | 512575 B | 12/2002 |
| TW | 200705714 A | 2/2007 |
| TW | 200806081 A | 1/2008 |
| WO | WO 2007023454 A1 | 3/2007 |
| WO | WO 2008/129504 | 10/2008 |

OTHER PUBLICATIONS

International Search Report Corresponding to International Application No. PCT/US2012/047344; Date of Mailing: Dec. 3, 2012; 16 Pages.

International Search Report Corresponding to International Application No. PCT/US12/47643; Date of Mailing: Oct. 25, 2012; 10 Pages.

International Search Report Corresponding to International Application No. PCT/US2012/054384; Date of Mailing: Nov. 26, 2012; 13 Pages.

International Search Report Corresponding to International Application No. PCT/US12/54869; Date of Mailing: Nov. 23, 2012; 10 Pages.

(56) References Cited

OTHER PUBLICATIONS

International Search Report Corresponding to International Application No. PCT/US12/54888; Date of Mailing: Nov. 23, 2012; 12 Pages.
International Preliminary Report Corresponding to International Application No. PCT/US2011/033736; Date of Mailing: Nov. 22, 2012; 8 Pages.
Japanese Office Action Corresponding to Japanese Patent Application No. 2012-530920; Mailing Date: Jun. 12, 2013; Foreign Text, 3 Pages.
Chinese Office Action and Search Report Corresponding to Chinese Application No. 201180022813.5; Date of Issue: Feb. 25, 2014; 5 Pages.
Chinese Office Action Corresponding to Chinese Patent Application No. 201080053242.7; Date of Issue: Nov. 27, 2013; 35 Pages.
European Search Report Corresponding to European Application No. 10849249.3; Dated: Mar. 27, 2014; 8 Pages.
European Search Report Corresponding to European Patent Application No. 11 77 7867; Dated: May 13, 2014; 7 Pages.
International Preliminary Report on Patentability Corresponding to International Application No. PCT/US2010/048225; Date of Mailing: Feb. 27, 2014; 9 Pages.
International Preliminary Report on Patentability Corresponding to International Application No. PCT/US2012/054384; Date of Mailing: Mar. 27, 2014; 11 Pages.
International Preliminary Report on Patentability Corresponding to International Application No. PCT/US2012/054869; Date of Mailing: Mar. 27, 2014; 8 Pages.
International Preliminary Report on Patentability Corresponding to International Application No. PCT/US2012/054888; Date of Mailing: Mar. 27, 2014; 10 Pages.
CN Office Action from corresponding CN App. No. 201180004266.8, mailed Nov. 3, 2014.
Chinese Office Action Corresponding to Chinese Patent Application No. 201280052473.5; Date of Notification: Jan. 4, 2015; 14 Pages.
Second Chinese Office Action Corresponding to Chinese Patent Application No. 201080053889.X; Date of Issue: Dec. 17, 2014; 16 Pages.
Chinese Office Action Corresponding to Chinese Patent Application No. 201280044038.8; Date of Notification: Dec. 12, 2014; Foreign Text, 16 Pages, English Translation Thereof, 7 Pages.

* cited by examiner

US 9,131,561 B2

SOLID-STATE LIGHTING APPARATUS AND METHODS USING ENERGY STORAGE

FIELD

The present inventive subject matter relates to lighting apparatus and methods and, more particularly, to solid-state lighting apparatus and methods.

BACKGROUND

Solid-state lighting arrays are used for a number of lighting applications. For example, solid-state lighting panels including arrays of solid-state light emitting devices have been used as direct illumination sources, for example, in architectural and/or accent lighting. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers.

Solid-state lighting arrays are used for a number of lighting applications. For example, solid-state lighting panels including arrays of solid-state light emitting devices have been used as direct illumination sources, for example, in architectural and/or accent lighting. Solid-state lighting devices are also used in lighting fixtures, such as incandescent bulb replacement applications, task lighting, recessed light fixtures and the like. For example, Cree, Inc. produces a variety of recessed downlights, such as the LR-6 and CR-6, which use LEDs for illumination. Solid-state lighting panels are also commonly used as backlights for small liquid crystal display (LCD) screens, such as LCD display screens used in portable electronic devices, and for larger displays, such as LCD television displays.

A solid-state light emitting device may include, for example, a packaged light emitting device including one or more light emitting diodes (LEDs). Inorganic LEDs typically include semiconductor layers forming p-n junctions. Organic LEDs (OLEDs), which include organic light emission layers, are another type of solid-state light emitting device. Typically, a solid-state light emitting device generates light through the recombination of electronic carriers, i.e. electrons and holes, in a light emitting layer or region.

Some attempts at providing solid-state lighting sources have involved driving an LED or string or group of LEDs using a rectified AC waveform. However, because the LEDs require a minimum forward voltage to turn on, the LEDs may turn on for only a part of the rectified AC waveform, which may result in visible flickering, may undesirably lower the power factor of the system, and/or may increase resistive loss in the system. Examples of techniques for driving LEDs with a rectified AC waveform are described in U.S. Patent Application Publication No. 2010/0308738 and in copending U.S. patent application Ser. No. 12/777,842 (filed May 7, 2010), the latter of which is commonly assigned to the assignee of the present application.

Other attempts at providing AC-driven solid-state lighting sources have involved placing LEDs in an anti-parallel configuration, so that half of the LEDs are driven on each half-cycle of an AC waveform. However, this approach requires twice as many LEDs to produce the same luminous flux as using a rectified AC signal.

SUMMARY

Some embodiments provide an apparatus including a first current control circuit configured to selectively provide current from a current source to at least one LED coupled in series with the first current control circuit and to at least one capacitor coupled to the at least one LED and the first current control circuit. The first current control circuit may be configured to cause the at least one capacitor to be selectively charged from the current source and to be discharged via the at least one LED responsive to a varying input, such as a varying voltage or current. For example, the first current control circuit may be configured to limit current through the at least one LED to less than a current provided by the current source.

In some embodiments, the apparatus may further include a second current control circuit configured to be coupled to a voltage source and configured to provide current to the at least one LED and to the at least one storage capacitor. The first current control circuit and the second current control circuit may be configured to cause the at least one capacitor to provide current to the at least one LED when a voltage of the voltage source is insufficient to forward-bias the at least one LED. The second current control circuit may include a current source circuit or a current sink circuit.

In some embodiments, the apparatus may further include a voltage regulator circuit configured to limit a voltage across the at least one capacitor.

In some embodiments, the first current control circuit may include a current limiter circuit. For example, the first current control circuit may include a current mirror circuit.

In additional embodiments, the apparatus may further include at least one bypass circuit configured to bypass at least one of a plurality of LEDs. The at least one bypass circuit may be configured to bypass at least one of the plurality of LEDs responsive to the varying input.

Some embodiments provide a lighting apparatus including a current source circuit, at least one LED coupled to an output of the current source circuit, at least one capacitor coupled to the output of the current source circuit and a current limiter circuit configured to limit a current through the at least one LED to less than a current produced by the current source circuit. The apparatus may further include a rectifier circuit having an input configured to be coupled to an AC power source and an output configured to be coupled to an input of the current source circuit. The at least one LED may include a plurality of LEDs, and the apparatus further includes at least one bypass circuit configured to bypass at least one of the plurality of LEDs.

Additional embodiments provide a lighting apparatus including a current source circuit, at least one first LED coupled to an output of the current source circuit, at least one capacitor coupled to the output of the current source circuit and a current limiter circuit configured to limit a current through the at least one LED to less than a current produced by the current source circuit. The apparatus further includes a plurality of second LEDs coupled in series with the current limiter circuit and the at least one first LED and bypass circuitry configured to selectively bypass the second LEDs responsive to a varying voltage applied to an input of the current source circuit.

In still further embodiments, a lighting apparatus includes at least one LED and a current control circuit configured to provide current to the at least one LED from a power source that produces a periodically varying voltage. The current control circuit is configured to cause the at least one LED to produce a light output that comprises clipped nonzero troughs coinciding with nulls of the varying voltage. In some embodiments, the light output may have a frequency no greater than twice a frequency of the varying voltage. The troughs may be maintained at about 5% or more of a peak level of the light output.

In some embodiments, the current control circuit may be configured to transfer energy from the power source to the at least one capacitor during a portion of a period of the varying voltage and from the at least one capacitor to the at least one LED near the nulls of the varying voltage.

In further embodiments, a lighting apparatus includes at least one LED and a current control circuit configured to provide current to the at least one LED and to at least one capacitor from a power source that produces an AC voltage. Energy is transferred from the power source to the at least one capacitor during a portion of a period of the AC voltage and transferred from the at least one capacitor to the at least one LED near zero crossings of the AC voltage. The light output may be constrained to have a minimum level of at least 5% of a peak level of the light output.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
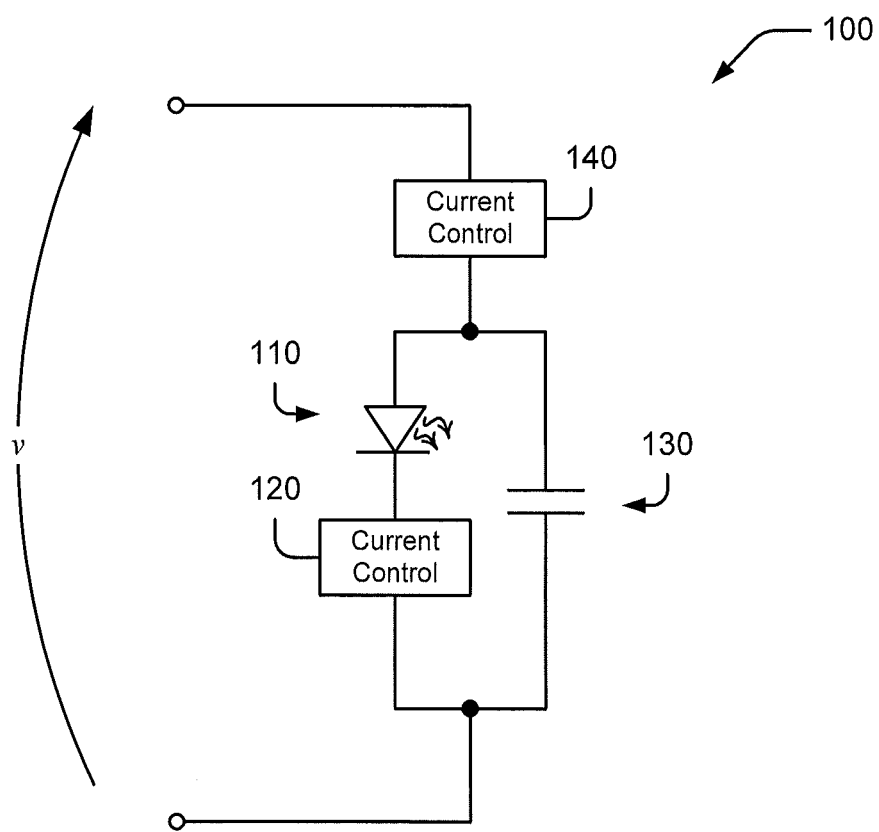
FIG. 1 illustrates a lighting apparatus according to some embodiments.

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

The present inventive subject matter further relates to an illuminated enclosure (the volume of which can be illuminated uniformly or non-uniformly), comprising an enclosed space and at least one lighting apparatus according to the present inventive subject matter, wherein the lighting apparatus illuminates at least a portion of the enclosed space (uniformly or non-uniformly).

Some embodiments of the inventive subject matter arise from a realization that flicker in an AC-driven LED lighting apparatus may be reduced by using a capacitor to store energy near peak voltage and using the stored energy to drive the LED(s) when the input AC voltage magnitude is less than required to forward bias the LED(s). In some embodiments, a current control circuit, for example, a current limiter circuit, is coupled in series with one or more LEDs. A storage capacitor may be coupled to the one or more LEDs. The current limiter circuit may be configured to direct current to the storage capacitor under certain input voltage conditions such that energy stored in the storage capacitor may be discharged via the one or more LEDs under other input voltage conditions. Thus, more uniform illumination may be achieved.

FIG. 1 illustrates a lighting apparatus 100 according to some embodiments. The apparatus 100 includes one or more LEDs 110. The one or more LEDs 110 may, for example, comprise a string of LEDs of a single or multiple colors. The one or more LEDs 110 may include, for example, a serial string of LEDs, serial combinations of paralleled LEDs or combinations thereof. The apparatus 100 may further include additional circuitry associated with the one or more LEDs 110, such as temperature and/or color compensation circuitry. Examples of compensation circuitry that may be used with LEDs are described in U.S. patent application Ser. No. 12/704,730 (filed Feb. 12, 2010), commonly assigned to the assignee of the present application and incorporated herein by reference.

The one or more LEDs 110 are coupled in series with the first current control circuit 120. One or more storage capacitors 130 may be coupled in parallel with the one or more LEDs 110 and the first current control circuit 120. The one or more storage capacitors 130 may include, for example, one or more electrolytic capacitors, ceramic capacitors, film capacitors, super-capacitors, ultra-capacitors and/or combinations thereof.

A second current control circuit 140 is coupled in series with the parallel combination of the one or more LEDs' 110, the first current control circuit 120 and the one or more storage capacitors 130. The first current control circuit 120 and the second current control circuit 140 are configured such that, in responsive to a time-varying voltage v, the one or more storage capacitors 130 are charged via the second current control circuit 140 and then discharged via the one or more LEDs responsive to the varying voltage v.

Figure 2:
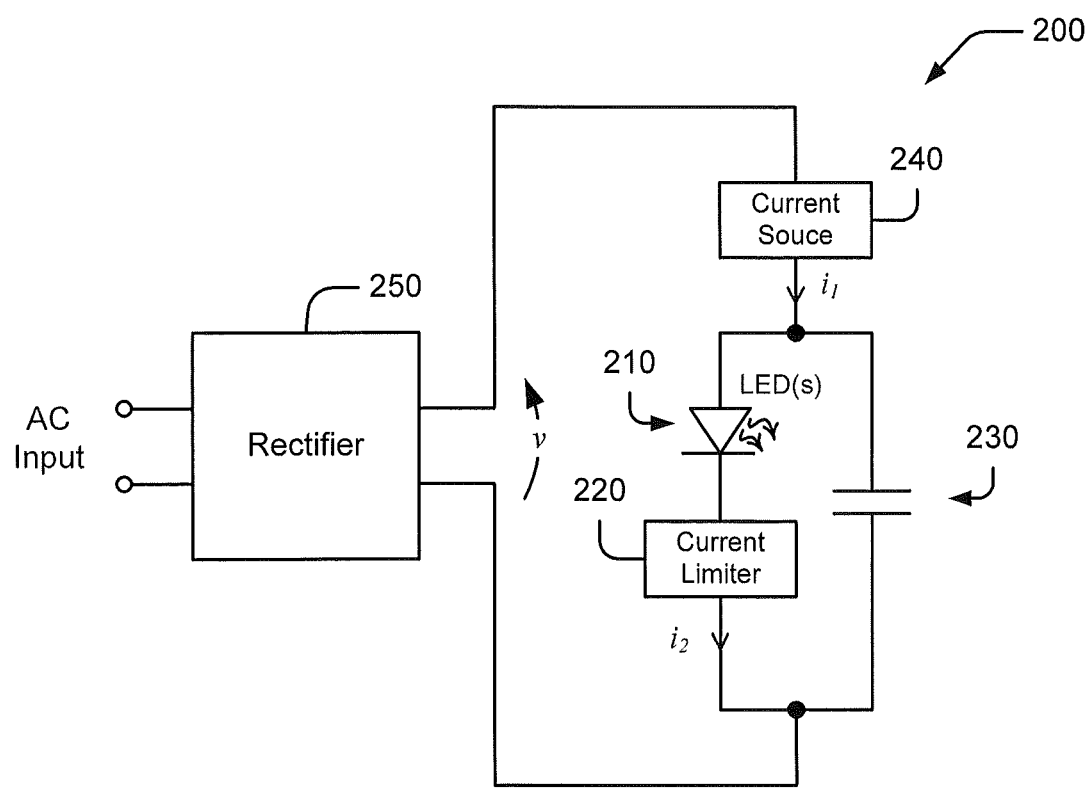
FIG. 2 illustrates a lighting apparatus according to further embodiments.

FIG. 2 illustrates an example of a lighting apparatus 200 along the lines described above. The lighting apparatus 200 includes one or more LEDs 210 coupled in series with a current limiter circuit 220, and one or more storage capacitors 230 coupled in parallel with the one or more LEDs 210 and the current limiter circuit 220. The one or more LEDs 210 may be configured in a number of different ways and may have various compensation circuits associated therewith, as discussed above with reference to the one or more LEDs 110 of FIG. 1. A current source circuit 240 is coupled to an output of a rectifier circuit 250 that produces a time-varying voltage v, e.g., a full-or-half wave rectified voltage, from an AC input. The current source circuit 240 provides a controlled current to the parallel combination of the one or more storage capacitors 230 and the one or more LEDs 210 and the current limiter circuit 220. The current limiter circuit 220 may be configured to limit current through the one or more LEDs 210 to a value less than a current provided by the current source circuit 240 such that current is diverted to the one or more storage capacitors 230, with the stored energy used to drive the one or more LEDs 210 in reduced-magnitude portions of the input AC voltage waveform.

Figure 3A:
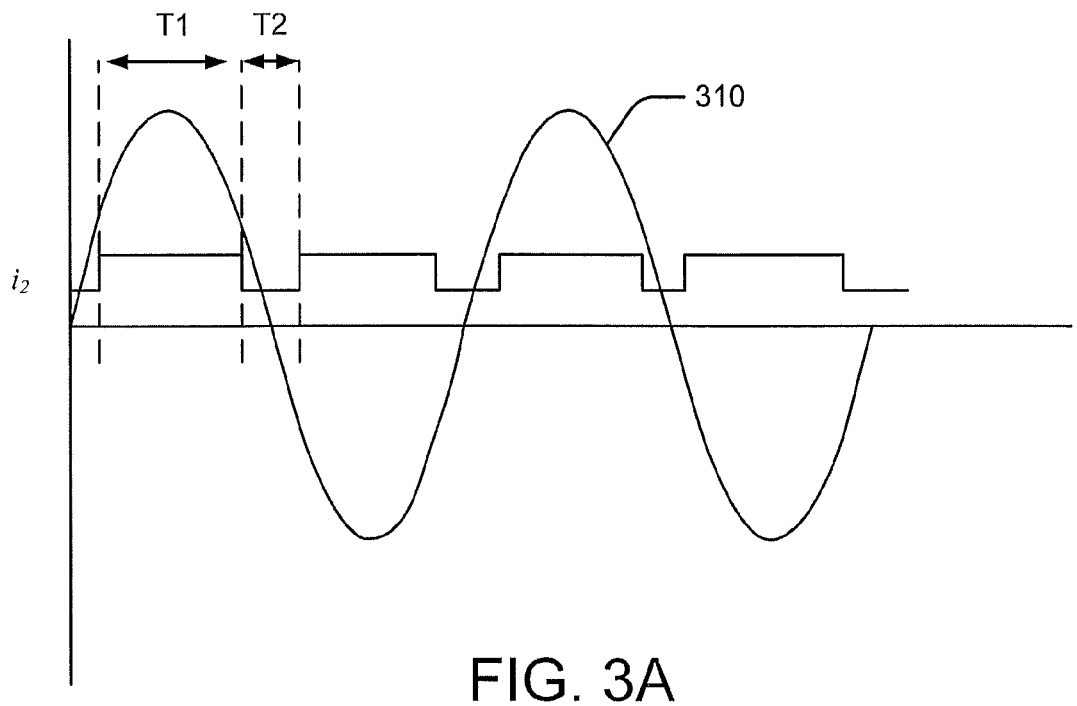
FIGS. 3A-B illustrate operations of a lighting apparatus according to some embodiments.
Figure 3B:
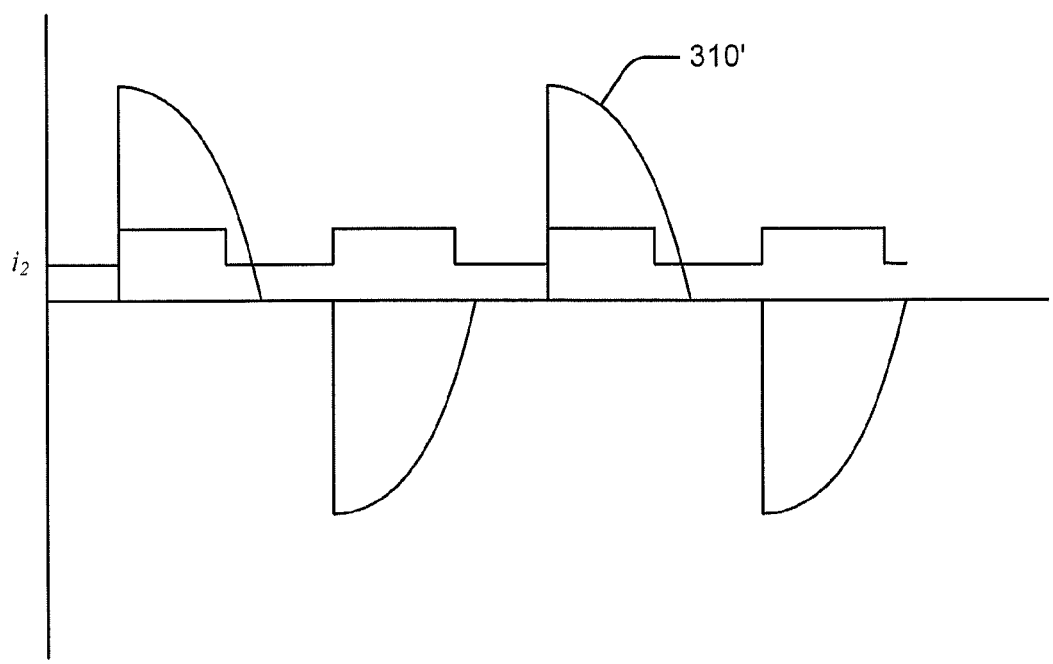

This is further illustrated in FIG. 3A, where it is assumed that the AC input has a sinusoidal voltage waveform 310 and the rectifier circuit 250 is a full-wave rectifier. During a time interval T1, the current limiter circuit 220 limits the current $i_2$ through the one or more LEDs 210 to a value less than the total current $i_1$ supplied by the current source circuit 240. During this period, current flows to one or more storage capacitors 230, thus charging the one or more capacitors 230. During an interval T2 in which the magnitude of the rectifier output voltage v falls below a certain level, the current $i_2$ through the one or more LEDs 210 is maintained by discharging the one or more storage capacitors 230. In this manner, the one or more LEDs 210 may continue to be illuminated, thus potentially reducing flicker in comparison to conventional AC drive circuits that shut off LED conduction for significant portions of the rectified AC waveform. As illustrated in FIG. 3B, the arrangement illustrated in FIG. 2 may be advantageous for applications using phase cut dimming. In particular, the AC input to the rectifier circuit 250 may be a phase cut AC signal (e.g., one generated from a conventional dimmer) having a phase-cut AC waveform 310'. The illumination produced by the one or more LEDs 210 may be reduced in proportion to the amount of phase cut, while the combined action of the current source circuit 240, the current limiter circuit 220 and the one or more storage capacitors 230 can reduce flicker by maintaining current through the one or more LEDs 210 during reduced-magnitude portions of the input AC waveform 310'. It will be appreciated that the voltage and current waveforms illustrated in FIGS. 3A and 3B are idealized for purposes of illustrations, and that waveforms exhibited by various practical embodiments may deviate therefrom depending, for example, on characteristics of the type of current source and current limit circuits used and/or properties of circuit components (e.g., transistors, capacitors, etc.) used in the circuitry.

It will be further understood that, although FIG. 2 illustrates use of a current source circuit 240 coupled between the output of a rectifier circuit 250 and one or more LEDs 210 and one or more storage capacitors 230, a current control circuit providing similar functionality may be coupled elsewhere. For example, the current source circuit 240 may be replaced by a current control circuit positioned at the input of the rectifier circuit 250 that controls current produced by the rectifier circuit 250.

Figure 4:
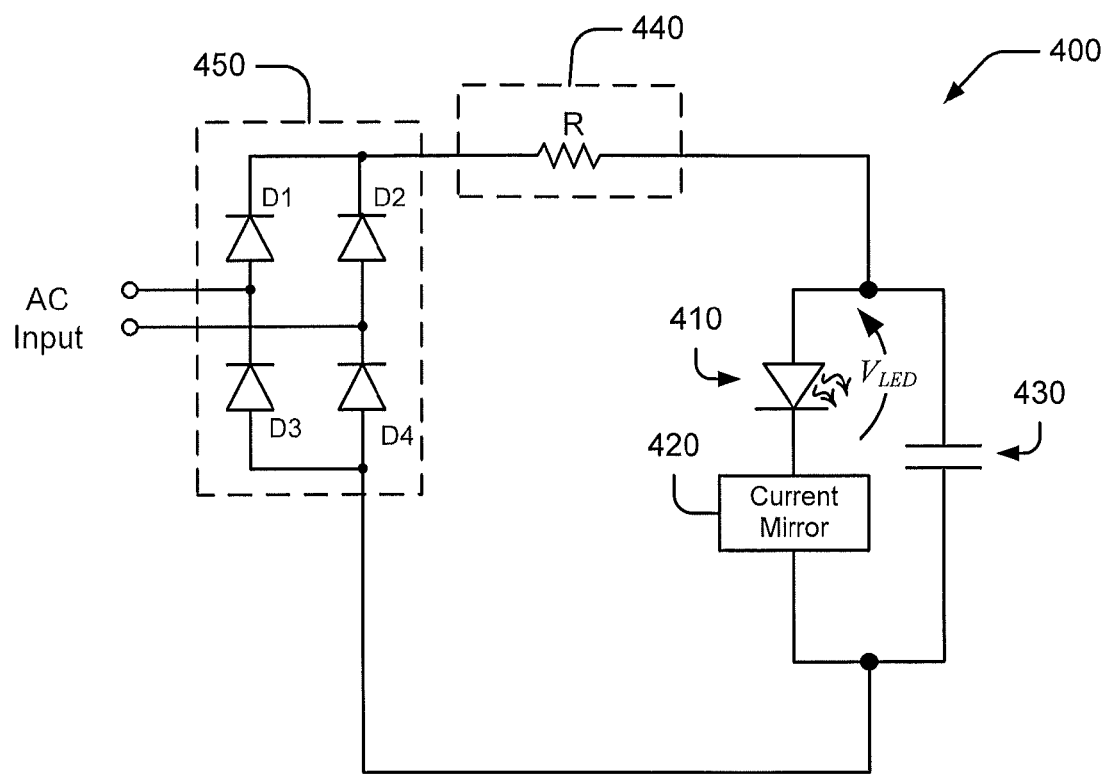
FIG. 4 illustrates a lighting apparatus according to further embodiments.

FIG. 4 illustrates a lighting apparatus 400 along the lines discussed above with reference to FIG. 2. The apparatus 400 includes one or more LED's 410 coupled in series with a current mirror circuit 420. The one or more LEDs 410 may be configured in a number of different ways and may have various compensation circuits associated therewith, as discussed above with reference to the one or more LEDs 110 of FIG. 1. One or more storage capacitors are coupled in parallel with the one or more LEDs 410 and the current mirror circuit 420. A current source circuit 440 includes a resistor R coupled to the parallel combination of the one or more storage capacitors 430 and the one or more LEDs 410 and the current mirror circuit 420. The current source circuit 440 is also coupled to a full-wave rectifier circuit 450, which includes diodes D1-D4. The current mirror circuit 420 may be configured to limit current through the one or more LEDs 410 to a level less than a nominal current produced by the current source circuit 440. In this manner, the one or more storage capacitors 430 may be alternately charged via the current source circuit 440 and discharged via the one or more LEDs 410, thus maintaining more uniform illumination.

Figure 5:
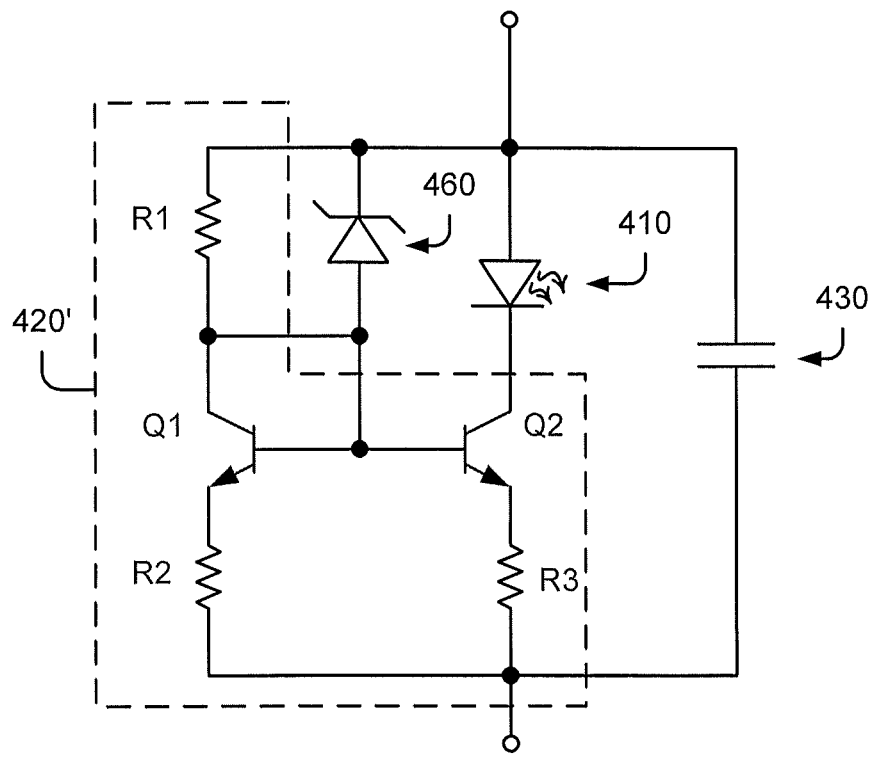
FIG. 5 illustrates a current mirror circuit for a lighting apparatus according to some embodiments.

FIG. 5 illustrates an example of current mirror circuit 420' that may be used in the apparatus 400 of FIG. 4, including first and second transistors Q1, Q2 and resistors R1, R2, R3 connected in a current mirror configuration. The current limit circuit 420' may provide a current limit of approximately $(V_{LED}-0.7)/(R1+R2)\times(R2/R3)$. A voltage limiter circuit 460, e.g., a zener diode, may also be provided to limit the voltage developed across the one or more storage capacitors 430.

Figure 6:
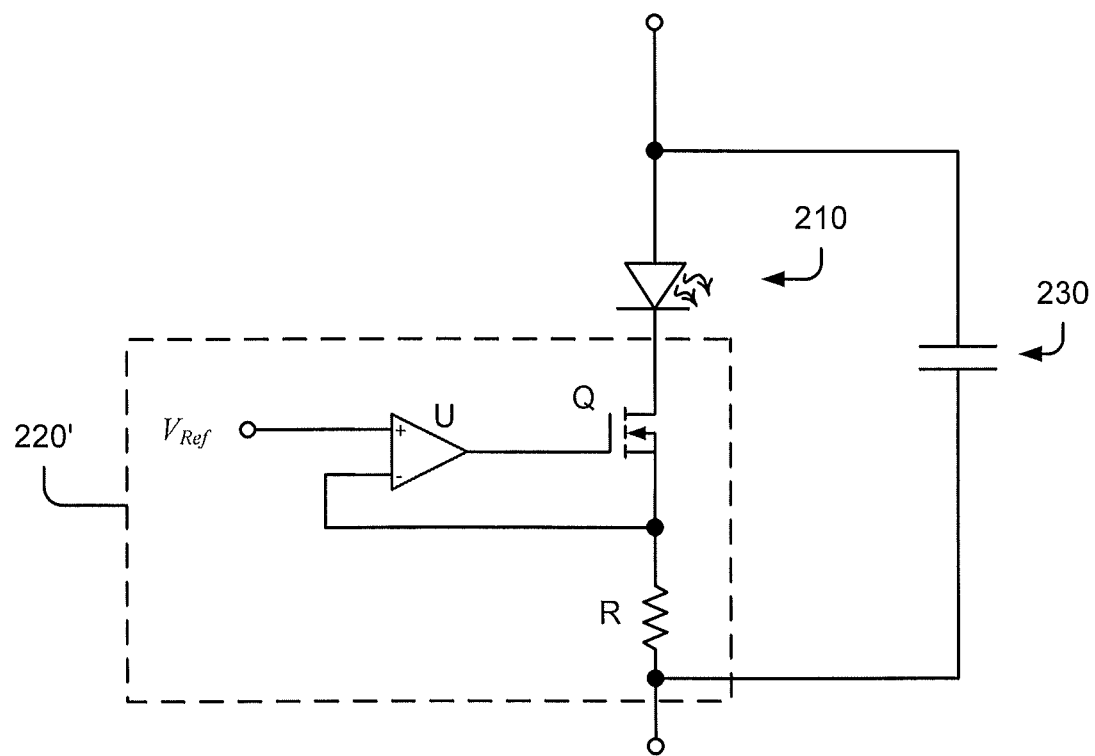
FIG. 6 illustrates a current control circuit for a lighting apparatus according to further embodiments.

It will be appreciated that any of a wide variety of circuits may be used for current control in a lighting apparatus along the line discussed above. FIG. 6 illustrates an example of a current limiter circuit 220' that may be used, for example, in the circuit arrangement of FIG. 2. The current limiter circuit 220' includes an amplifier U that generates a drive signal for a transistor Q coupled in series with one or more LEDs 210. The amplifier U generates the transistor drive signal responsive to a comparison of a reference voltage $V_{ref}$ to a current sense signal generated by a current sense resistor R coupled in series with the one or more LEDs and the transistor Q.

Figure 7:
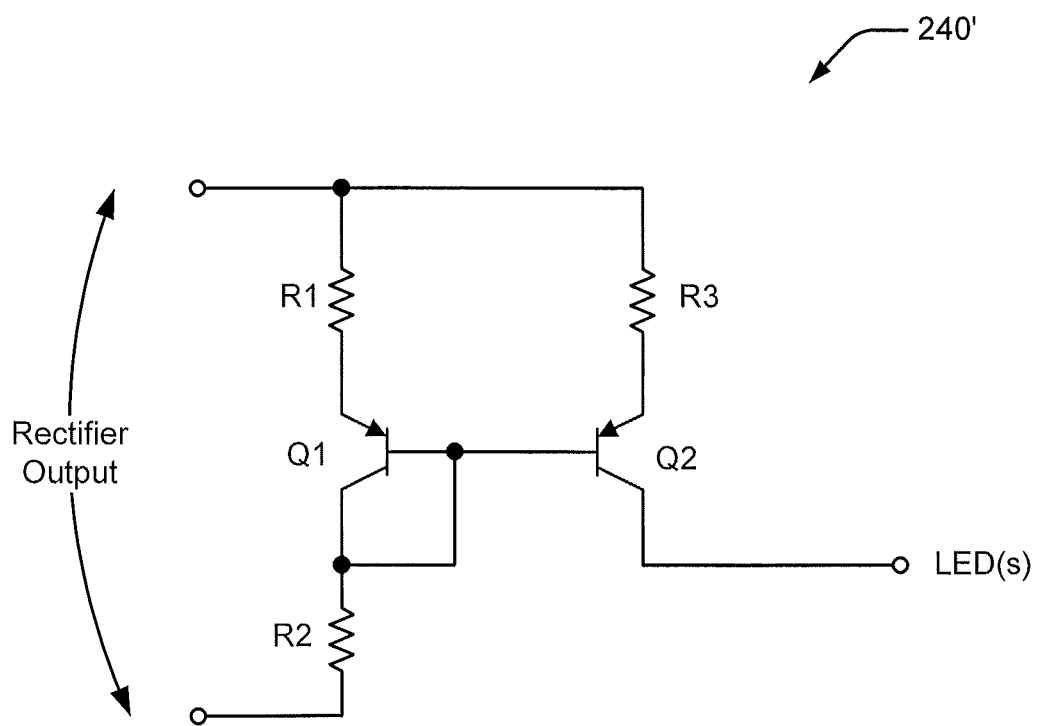
FIG. 7 illustrates a current source circuit for a lighting apparatus according to some embodiments.

Similarly, a wide variety of different circuit may be used for a current source for an LED/capacitor load. For example, FIG. 7 illustrates a current source circuit 240' that may be used in the circuit arrangement of FIG. 2. The current source circuit 240' includes transistors Q1, Q2 and resistors R1, R2, R3 arranged in a current mirror configuration.

According further embodiments, capacitive energy storage techniques as discussed above may be combined with techniques in which LEDs are incrementally switched on and off in response to a varying input voltage, such as a rectified AC waveform. For example, the aforementioned U.S. patent application Ser. No. 12/775,842 describes lighting apparatus in which LEDs in string are selectively bypassed in response to a varying voltage waveform. Such bypass circuitry may be combined with capacitive storage techniques along the lines discussed above.

Figure 8:
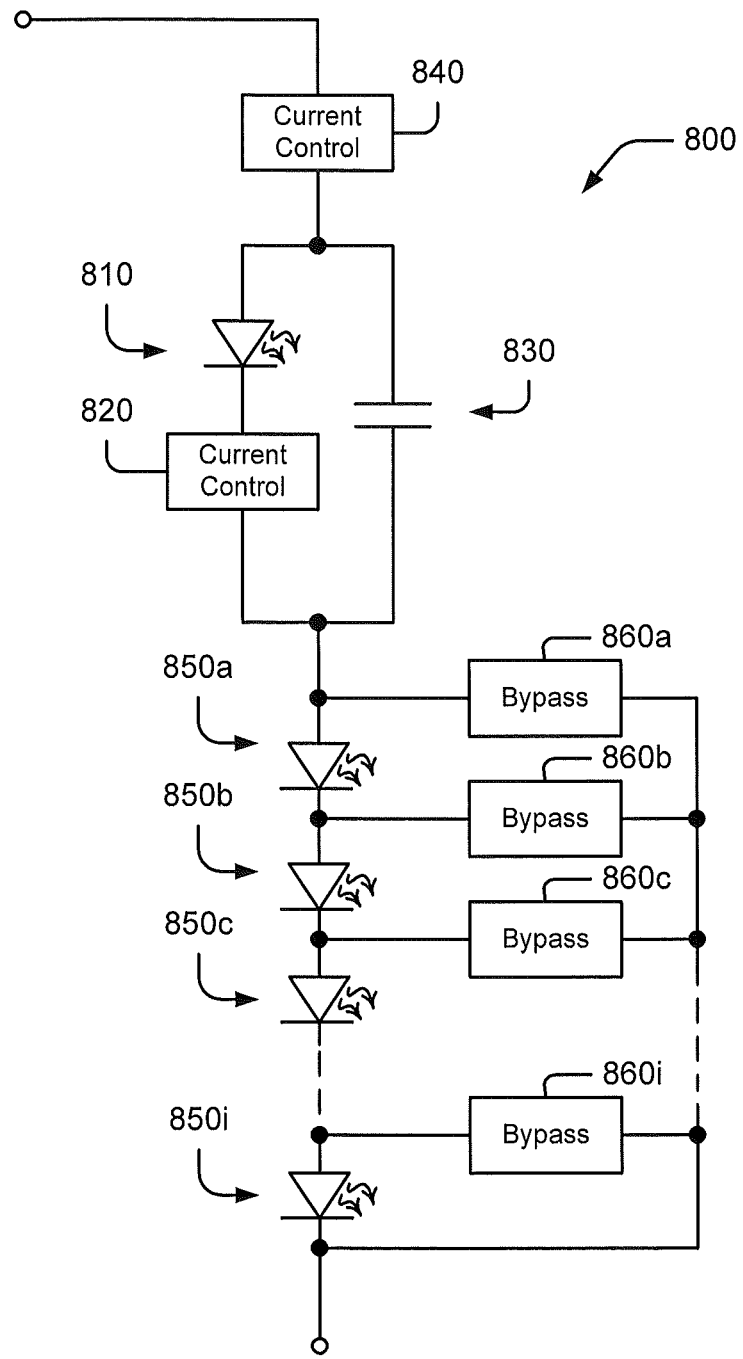
FIG. 8 illustrates a lighting apparatus according to further embodiments.

FIG. 8 illustrates an example of such a combination. A lighting apparatus 800 includes one or more LEDs 810 coupled in series with a first current control circuit 820, with one or more storage capacitors 830 coupled in parallel with the one or more LEDs 810 and the first current control circuit 820.

A second current control circuit 840 is coupled in series with these components, along with a string 850 of additional LEDs. The string 850 may be arranged in groups 850a, 850b, 850c, . . . , 850i, which may be selectively bypassed using bypass circuits 860a, 860b, 860c, . . . 860i. The groups 850a, 850b, 850c, . . . , 850i may each include one or more LEDs, which may be connected in various parallel and/or serial ways. Responsive to a varying input voltage v (e.g., a full-wave rectified waveform produced by a rectifier), the bypass circuits 860a, 860b, 860c, . . . 860i may operate such that the groups 850a, 850b, 850c, . . . , 850i of LEDs are incrementally coupled in series with the one or more LEDs 810 as the magnitude of the input voltage v increases. The first and second current control circuit 820, 840 may be configured such that current is eventually diverted to the one or more storage capacitors at or near the peak of the input voltage v. As the magnitude of the input voltage v decreases, the groups 850a, 850b, 850c, . . . , 850i of LEDs are incrementally bypassed. When the magnitude of the input voltage v approaches its minimum, current may be discharged from the one or more storage capacitors 830 through the one or more LEDs 810 to maintain illumination until the magnitude of the input voltage v again increases.

It will be understood that the apparatus 800 of FIG. 8 is provide as an example for purposes of explanation, and that a variety of other bypass circuit arrangements may be used. For example, bypass circuitry may be used to bypass individual segments of a string of LEDs, rather than the shunt arrangement shown in FIG. 8. Other arrangements may include reversed arrangements of the circuit shown in FIG. 8, e.g., the energy-storing component may be connected at the "bottom" of the LED string, rather than the "top" side arrangement illustrated in FIG. 8.

It will also be appreciated that embodiments of the inventive subject may have any of a variety of physical arrangements, e.g., different arrangements of circuit components and/or packaging of such components. For example, some embodiments may provide a lighting apparatus with both integrated driver circuitry (e.g., current source and limit circuits) and storage capacitance. Further embodiments may provide lighting apparatus with provision for connection to external storage capacitance. Some embodiments may provide a driver device configured to be coupled to one or more LEDs and to one or more external storage capacitors. Still further embodiments may include bypass circuitry and/or voltage source circuitry, such as a rectifier circuit.

Figure 9:
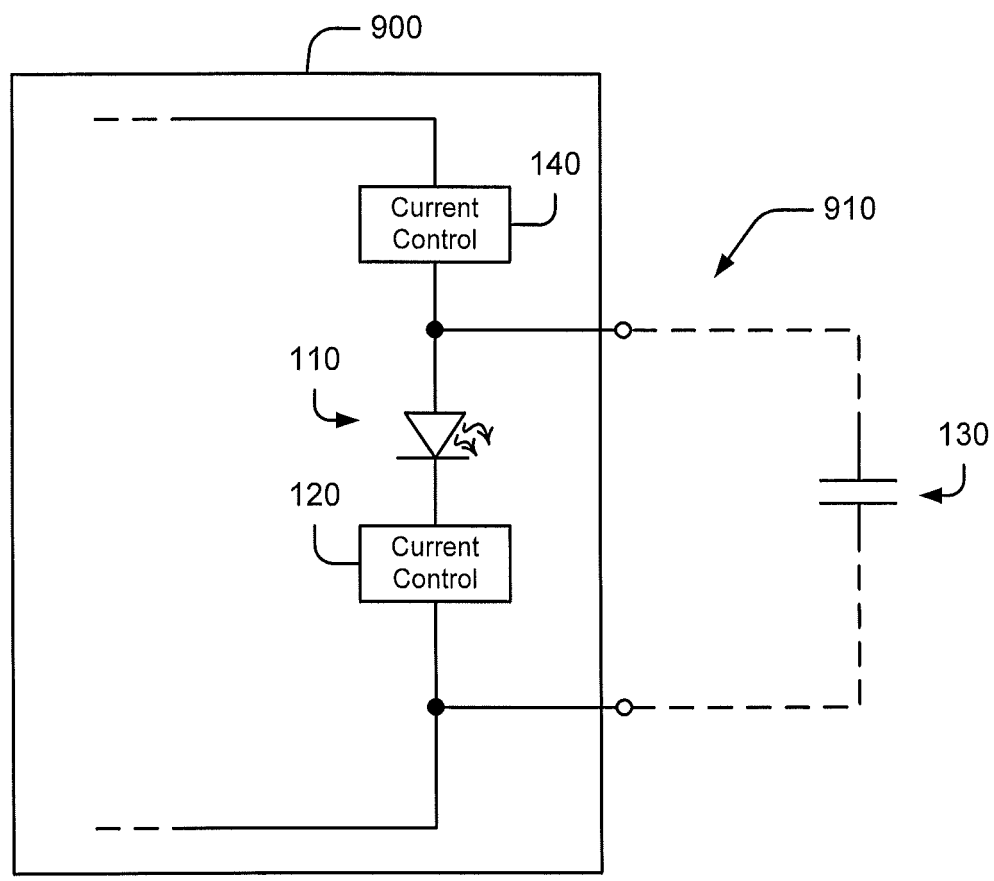
FIG. 9 illustrates a lighting apparatus configured to be coupled to at least one external capacitor according to some embodiments.
Figure 10:
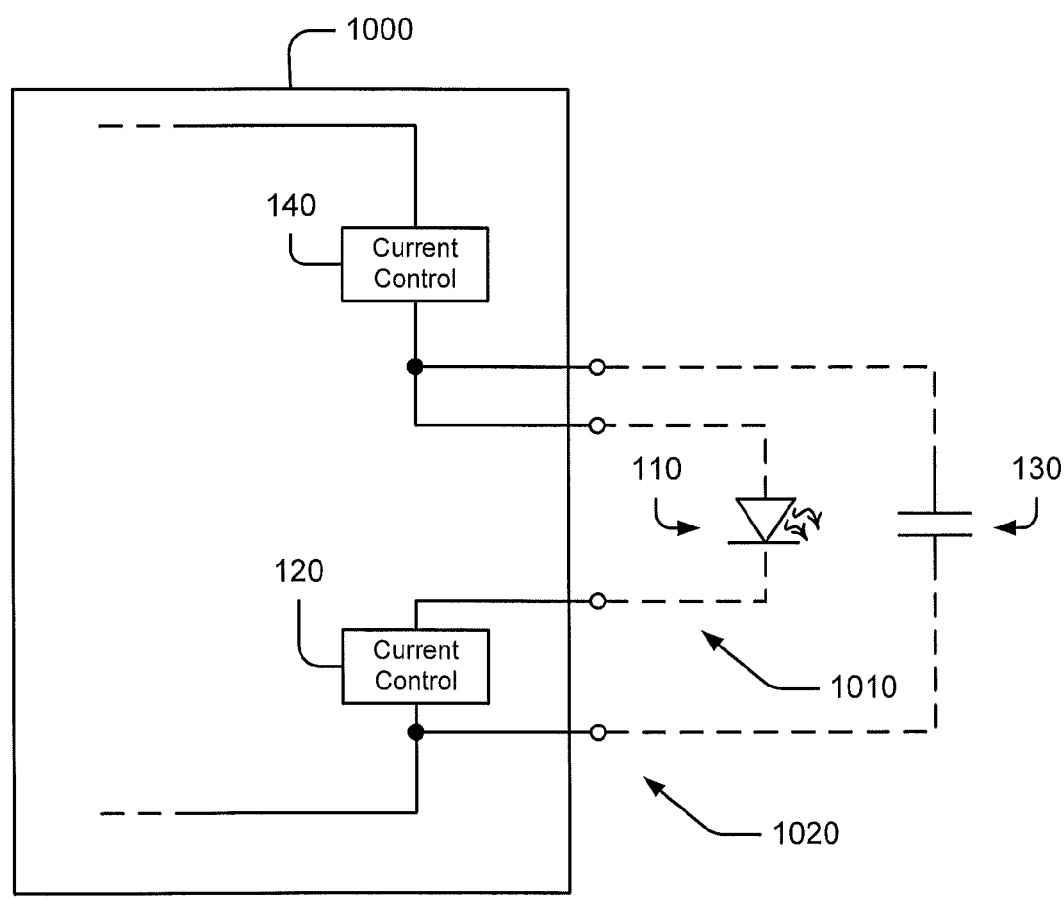
FIG. 10 illustrates a driver device configured to be coupled to at least one LED and at least one capacitor according to some embodiments.
Figure 11:
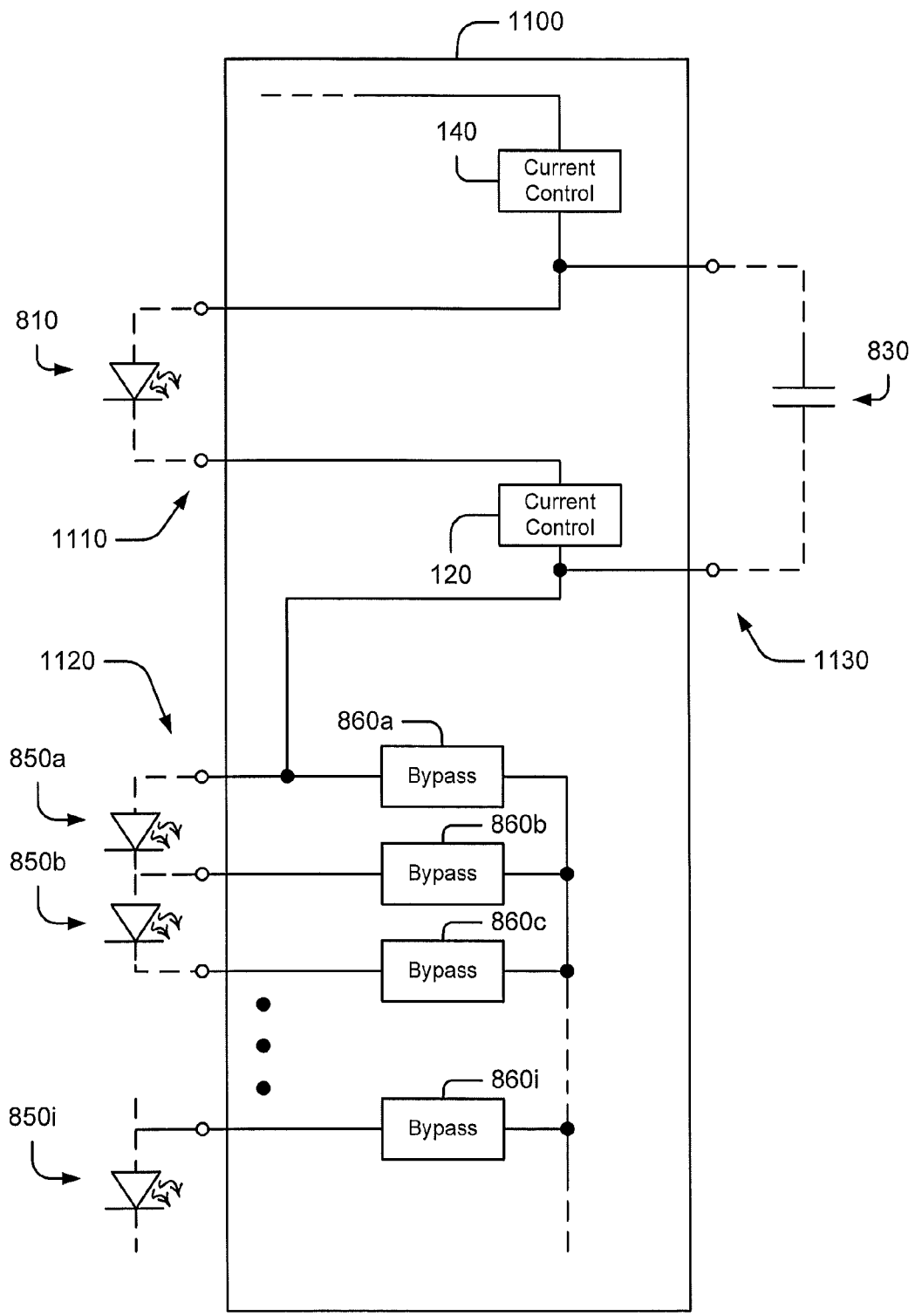
FIG. 11 illustrates driver device with bypass circuitry according to some embodiments.

FIG. 9 illustrates a lighting apparatus 900 according to some embodiments. The lighting apparatus 900 includes first and second current control circuits 120, 140 and one or more LEDs 110, along lines discussed above. The apparatus 900 further includes a port 910 configured to be coupled to one or more external storage capacitors. FIG. 10 illustrates a device 1000, e.g., an integrated circuit, circuit module or the like, including first and second current control circuits 120, 140 along lines discussed above. The device 1000 includes ports 1010, 1020 configured to be coupled to one or more LEDs 110 and one or more storage capacitors 130 external to the device 1000. FIG. 11 illustrates a device 1100 including first and second current control circuits 120, 140, along with one or more bypass circuits 860a, 860b, 860c, ..., 860i along lines discussed above with reference to FIG. 8. The device 1100 includes ports 1110, 1120, 1130 configured to be coupled to one or more LEDs 110 and one or more storage capacitors 130 external to the device 1100.

Figure 12:
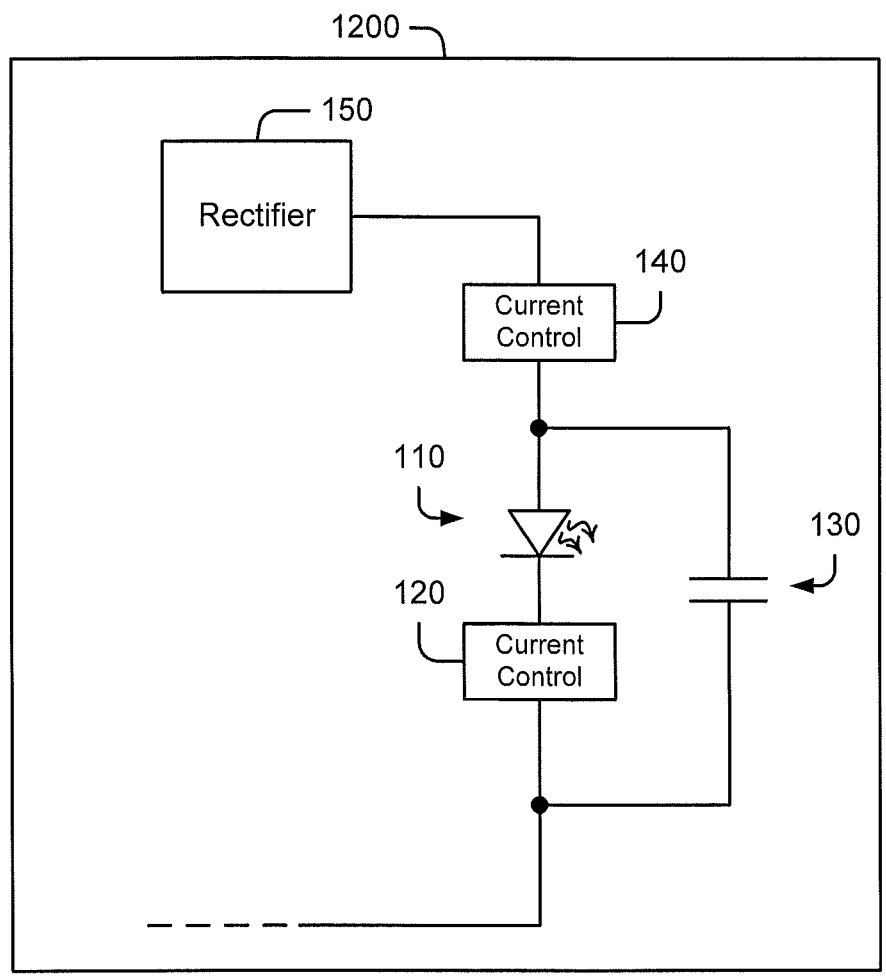
FIG. 12 illustrates a lighting apparatus with an external capacitor connection according to further embodiments.

FIG. 12 illustrates a lighting apparatus 1200 including first and second current control circuits 120, 140, one or more LEDs 110 and one or more storage capacitors 130, along with an integrated rectifier circuit 150. It will be appreciated that a rectifier or other voltage source circuit may be similarly integrated in the devices illustrated in FIGS. 9-11.

Figure 13:
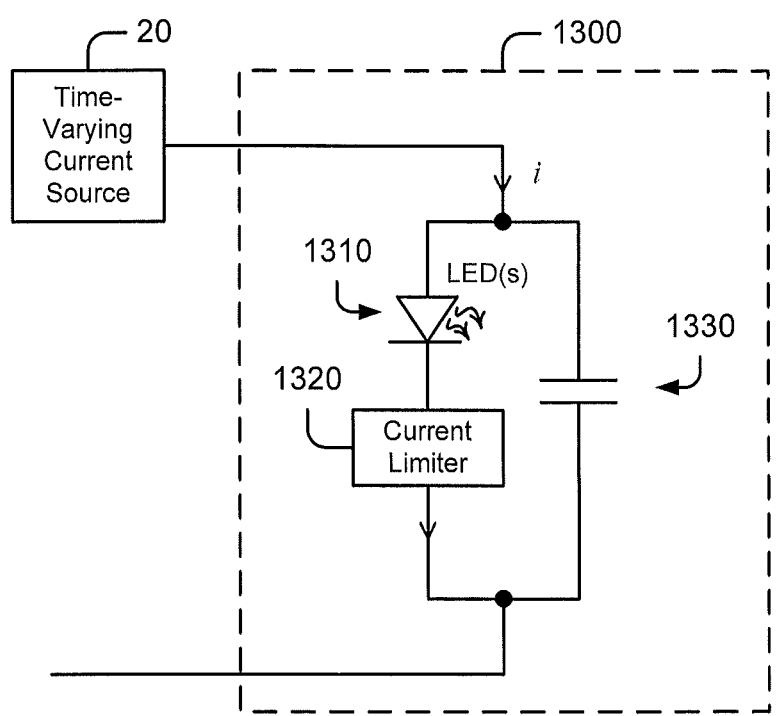
FIG. 13 illustrates a lighting apparatus for use with a time-varying current source according to further embodiments.

According to further embodiments, a lighting apparatus utilizing energy storage techniques similar to those discussed above may be used with current source that provides a time-varying current. For example, as illustrated in FIG. 13, a lighting apparatus 1300 may include one or more LEDs 1310 coupled in series with a current limiter circuit 1320, and one or more storage capacitors 1330 coupled in parallel with the one or more LEDs 1310 and the current limiter circuit 1320. The apparatus 1300 may be configured to be coupled to a current source circuit 20 that produces a time-varying output current i, which may be an AC current or a DC current. The current limiter circuit 1320 may be configured to limit current through the one or more LEDs 1310 to a value less than a peak value of the time-varying current i such that current is diverted to charge the one or more storage capacitors 1330 when the time-varying current i exceeds the current limit of the current limiter circuit 1320. When the time-varying current i decreases below the current limit, current may be delivered from the one or more storage capacitors 1330 to the one or more LEDs 1310 to maintain a given level of illumination. The current limiter circuit 1320 may take the form, for example, of the current limiter circuitry illustrated in FIG. 5. Additional circuitry, such as the voltage limiting circuitry illustrated in FIG. 5 and/or the bypass circuitry illustrated in FIG. 8, may also be included in the apparatus 1300. Some embodiments may use circuitry along the lines illustrated in FIG. 13, but with provision of one or more ports for connection of external LEDs and/or storage capacitors, along the lines discussed above with reference to FIGS. 9-12.

According to further embodiments, a light output from an AC powered LED lighting apparatus may be "valley filled" using, for example, techniques along the lines discussed above, so that perceptible flicker may be reduced or eliminated. In particular, a periodic light output with "clipped" troughs near the zero crossings of an AC power input may be obtained by using a storage capacitor to provide current to at least one LED during time periods near the zero crossings. Using techniques along the lines described above, cycling of the storage capacitor may be limited to twice the AC voltage frequency (e.g., 120 Hz for a 60 Hz AC power source), such that reliability of the storage capacitor may be improved in comparison to the reliability of storage capacitors used in designs that use, for example, switch mode power supplies that operate at 10 kHz or greater.

Figure 14:
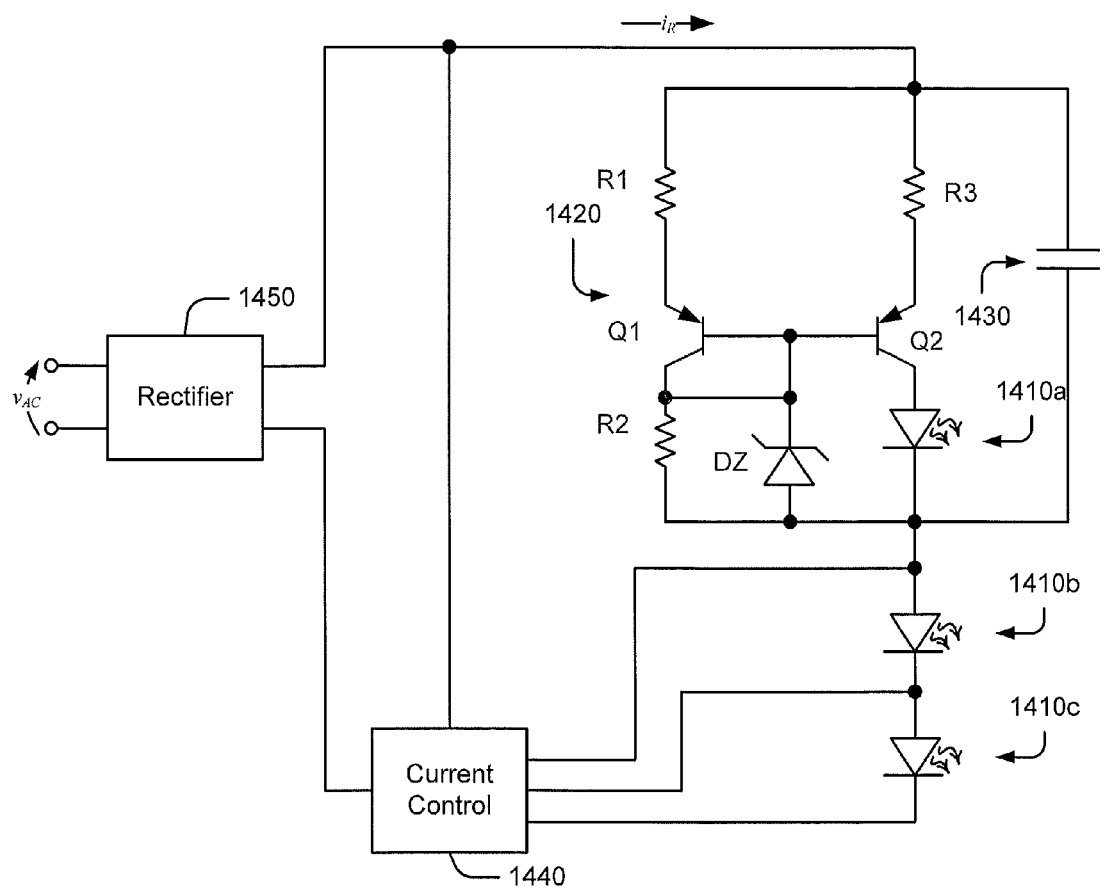
FIG. 14 illustrates a lighting apparatus according to further embodiments.
Figure 15:
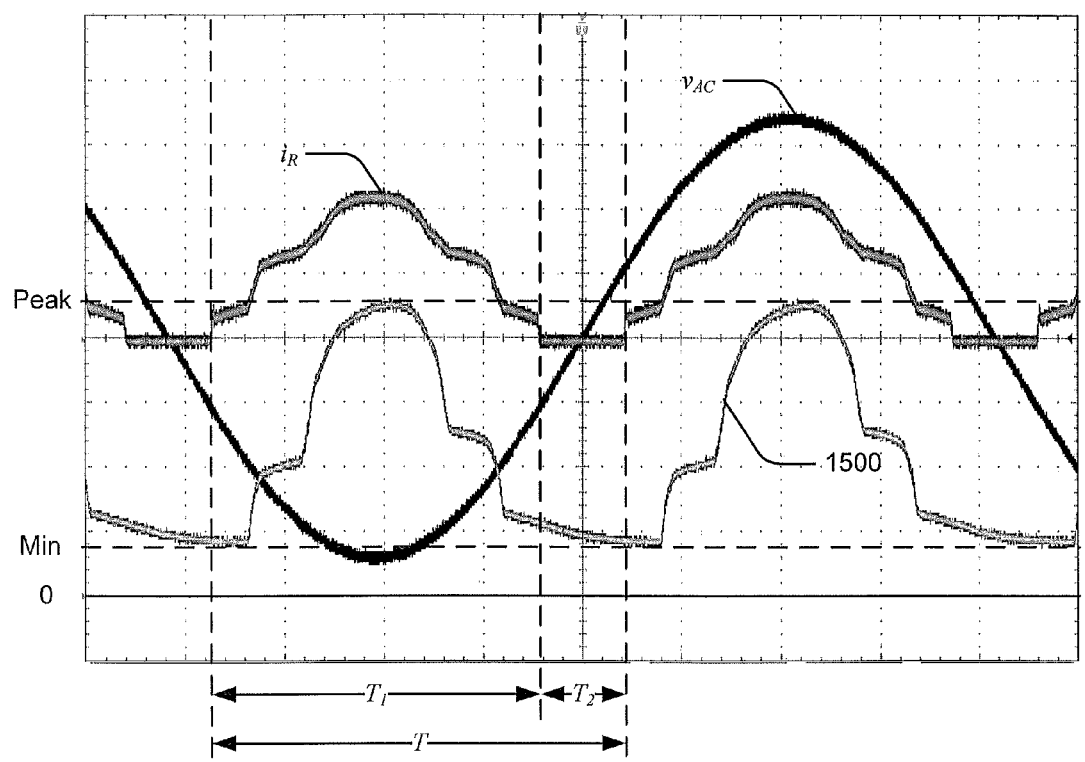
FIG. 15 illustrates voltage, current and light output characteristics of the lighting apparatus of FIG. 14.

FIG. 14 illustrates a lighting apparatus 1400 according to further embodiments, while FIG. 15 illustrates voltage, current and light output characteristics of the apparatus 1400. The apparatus 1400 includes a string of serially-connected sets 1410a, 1410b, 1410c of LEDs. A rectifier circuit 1450 is configured to receive power from a power source, which provides an AC voltage $v_{AC}$, and to produce a full-wave rectified output current $i_R$. A storage capacitor 1430 is coupled to the first set 1410a of at least one LED. A current limiter circuit 1420 is configured to limit current flowing through a first set 1410a of one or more LEDs. The current limiter circuit 1420 is a dual of the circuit illustrated in FIG. 5, and includes transistors Q1, Q2 and resistors R1, R2, R3. A zener diode DZ provides overvoltage protection. A current control circuit 1440 provides selective bypassing of the sets 1410b, 1410c of LEDs. This current control circuit 1440 may take any of a number of different forms, and generally may operate to bypass the sets 1410a, 1410b such that the sets 1410b, 1410c are incrementally added and removed from series connection with the first set 1410 as the rectified voltage produced by the rectifier circuit 1450 increases and decreases. This operation results in a "stepped" current waveform for the input current $i_R$, as illustrated in FIG. 15.

As further illustrated in FIG. 15, a periodic light output 1500 is thus produced by the apparatus 1400. During a first portion $T_1$ of a period T of the light output 1500, the light output generally tracks the AC voltage $v_{AC}$, with the storage capacitor 1430 being charged at and near the magnitude peaks of the AC voltage $v_{AC}$. During a second portion $T_2$ of the period T, the light output 1500 is "clipped" (held up) to a level that is at least 5% of the peak light output level at by transfer of stored charge from the storage capacitor 1430 to the first set 1410a of at least one LED such that a non-zero light output level is maintained at nulls (e.g., zero crossings) of the AC voltage $v_{AC}$. Although perception of flicker in lighting is generally dependent on the observer, it is believed that maintaining a minimum light output level of at least 5-10% of the maximum light output level renders flicker negligibly perceptible.

Figure 16:
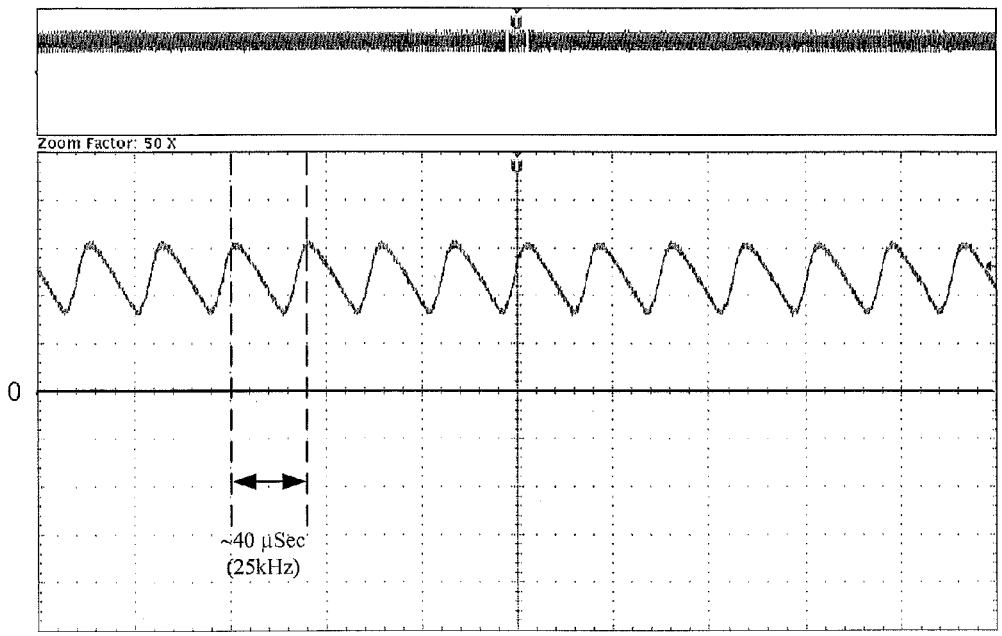
FIGS. 16 and 17 illustrate current waveforms of lighting apparatus powered by switchmode power supply circuitry.
Figure 17:
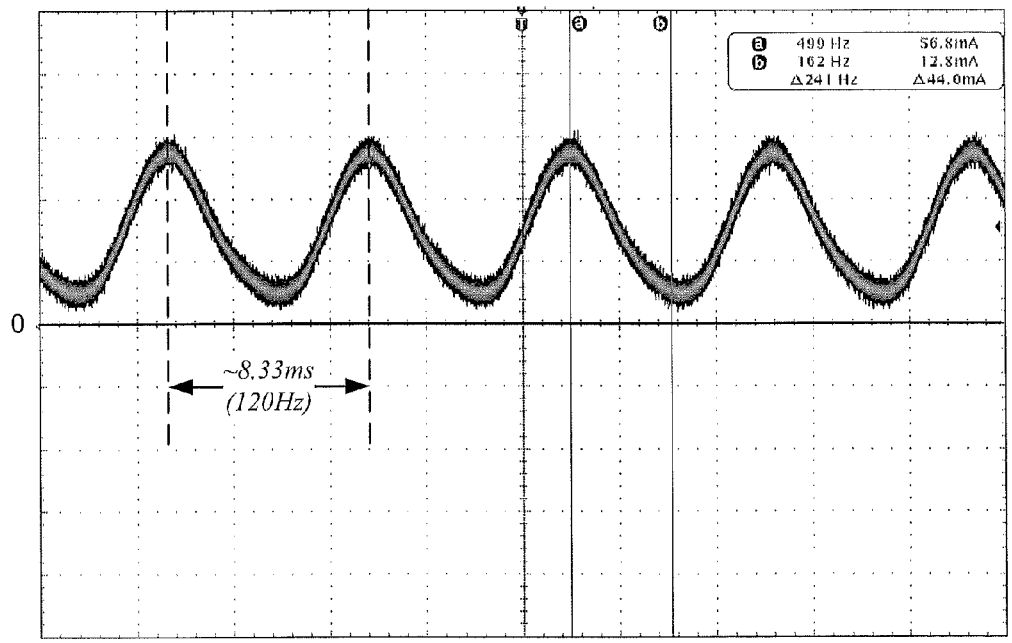

As shown in FIGS. 16 and 17, the LED current waveforms produced by different types of switch-mode power supply circuits in off-line LED systems produce a similar light output (waveform) which typically does not create visible flicker but at the expense of complex and costly circuitry. A switch-mode power supply LED driver also typically needs an electromagnetic interference (EMI) filter to comply with stringent FCC or similar regulatory agency limits. A potential advantage of circuits such as the one illustrated in FIG. 14 is that there may be no need for an EMI filter as there is no high-frequency switching. Another potential advantage is that the storage capacitor 1430 is cycled (charged/discharged) at a relatively low rate and lower RMS current levels in comparison to the high cycle rates and high RMS currents typically experienced by storage capacitors used in conventional switch-mode power supply circuits, thus potentially improving reliability and useful lifetime and/or enabling the use of less expensive storage capacitors. These features may be particularly valuable in solid-state lighting applications, in which low cost and high reliability are distinct advantages.

In off-line LED systems which do not use switch-mode power supplies as LED drivers, such as AC LED systems with only a rectifier and a current limiting resistor, the light output typically falls to at or near zero when the input voltage falls below the level of the LED string voltage, which may cause visible flicker at twice the line frequency. In some AC LED systems that use multiple switched LED segments and no energy storage, the light output may stay at zero for a shorter duration than non-segmented AC LED systems, but still may cause visible flicker. Such flicker may be more prominent and perceptible when objects are moving around or back and forth in the presence of such a light, as human eyes tend to be more sensitive to sudden changes in light level, such as going completely dark, and less sensitive to gradual changes. Some embodiments of the inventive subject matter, such as in the lighting apparatus of FIG. 14, may produce a light output that does not go to zero using a "valley fill" or "light fill" technique without the complexity of using a switch-mode power supply.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. An apparatus comprising:
a first current control circuit configured to be coupled to at least one LED and to at least one capacitor such that the first current control circuit is in series with at least one LED and the first current control circuit and the at least one LED are in parallel with the at least one capacitor, the first current control circuit further configured to control current passing from a current source through the at least one LED such that current is diverted to the at least one capacitor in a first state and the at least one capacitor is discharged through the at least one LED in a second state.

2. The apparatus of claim 1, wherein the first current control circuit is configured to cause the at least one capacitor to be selectively charged from the current source and to be discharged via the at least one LED responsive to a varying input.

3. The apparatus of claim 2, wherein the first current control circuit is configured to limit current through the at least one LED to less than a current provided by the current source.

4. The apparatus of claim 2, further comprising a second current control circuit configured to be coupled to a voltage source and configured to provide current to the at least one LED and to the at least one storage capacitor.

5. The apparatus of claim 4, wherein the first current control circuit and the second current control circuit are configured to cause the at least one capacitor to provide current to the at least one LED when a voltage of the voltage source is insufficient to forward-bias the at least one LED.

6. The apparatus of claim 4, wherein the second current control circuit comprises a current source circuit or a current sink circuit.

7. The apparatus of claim 4, further comprising the voltage source.

8. The apparatus of claim 7, wherein the voltage source comprises a rectifier circuit.

9. The apparatus of claim 1, further comprising a voltage regulator circuit configured to limit a voltage across the at least one capacitor.

10. The apparatus of claim 1, wherein the first current control circuit comprises a current limiter circuit.

11. The apparatus of claim 1, wherein the first current control circuit comprises a current mirror circuit.

12. The apparatus of claim 1, further comprising a port configured to be coupled to the at least one LED.

13. The apparatus of claim 1, further comprising the at least one LED.

14. The apparatus of claim 1, further comprising a port configured to be coupled to the at least one capacitor.

15. The apparatus of claim 1, further comprising the at least one capacitor.

16. The apparatus of claim 1, wherein the apparatus further comprises at least one bypass circuit configured to bypass at least one of a plurality of LEDs.

17. The apparatus of claim 16, wherein the at least one bypass circuit is configured to bypass at least one of the plurality of LEDs responsive to the varying input.

18. The apparatus of claim 16, further comprising at least one port configured to be coupled to the plurality of LEDs.

19. The apparatus of claim 16, further comprising the plurality of LEDs.

20. A lighting apparatus comprising:
a current source circuit;
at least one LED coupled to an output of the current source circuit;
at least one capacitor coupled to the output of the current source circuit; and
a current limiter circuit configured to limit a current through the at least one LED to less than a current produced by the current source circuit, wherein the current source circuit and the current limiter circuit are configured to cause the at least one capacitor to be selectively charged via the current source circuit and discharged via the at least one LED responsive to a varying voltage applied to an input of the current source circuit.

21. The apparatus of claim 20, further comprising a rectifier circuit having an input configured to be coupled to an AC power source and an output configured to be coupled to an input of the current source circuit.

22. The apparatus of claim 20, wherein the current limiter circuit comprises a current mirror circuit coupled in series with the at least one LED.

23. The apparatus of claim 20, wherein the at least one LED comprises a plurality of LEDs, wherein the apparatus further comprises at least one bypass circuit configured to bypass at least one of the plurality of LEDs.

24. A lighting apparatus comprising:
at least one LED; and
a current control circuit configured to provide current to the at least one LED from a power source that produces a periodically varying voltage, the current control circuit configured to cause the at least one LED to produce a light output that comprises clipped non-zero troughs coinciding with nulls of the varying voltage.

25. The apparatus of claim 24, wherein the troughs are maintained at about 5% or more of a peak level of the light output.

26. The apparatus of claim 24, wherein the current control circuit is configured to transfer energy from the power source to at least one capacitor during a portion of a period of the varying voltage and from the at least one capacitor to the at least one LED near the nulls of the varying voltage.

27. The apparatus of claim 26, wherein the current control circuit is configured to cycle the at least one capacitor at a frequency no greater than twice a frequency of the varying voltage.

28. The apparatus of claim 24, wherein the varying voltage comprises an AC voltage or a rectified AC voltage.

29. The apparatus of claim 24, wherein the current control circuit does not include a switchmode power conversion circuit.

30. A lighting apparatus comprising:
at least one LED; and
a current control circuit configured to provide current to the at least one LED and to at least one capacitor from a power source that produces an AC voltage such that energy is transferred from the power source to the at least one capacitor during a portion of a period of the AC voltage and transferred from the at least one capacitor to the at least one LED near zero crossings of the AC voltage.

31. The apparatus of claim 30, wherein the current control circuit is configured to cycle the at least one capacitor at a frequency no greater than twice a frequency of the AC voltage.

32. The apparatus of claim 30, wherein the light output is constrained to have a minimum level of at least 5% of a peak level of the light output.

33. The apparatus of claim 30, wherein the current control circuit does not include a switchmode power conversion circuit.

* * * * *